(12) United States Patent
Lee et al.

(10) Patent No.: US 6,442,171 B1
(45) Date of Patent: Aug. 27, 2002

(54) LOGICAL TOPOLOGY AND ADDRESS ASSIGNMENT FOR INTERCONNECTED DIGITAL NETWORKS

(75) Inventors: Kuo-Chun Lee; Bibhu Mohanty; Todd R. Sutton; Noam A. Ziv, all of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/085,116

(22) Filed: May 26, 1998

(51) Int. Cl.⁷ .............................. H04L 12/56; H04J 3/24
(52) U.S. Cl. .................... 370/408; 370/256; 370/401
(58) Field of Search ........................ 370/254, 255, 370/256, 312, 389, 390, 392, 393, 401, 408, 320, 335, 342, 441

(56) References Cited

U.S. PATENT DOCUMENTS

| | | | |
|---|---|---|---|
| 4,706,080 A | * 11/1987 | Sincoskie | 370/401 |
| 5,130,977 A | * 7/1992 | May et al. | 370/422 |
| 5,295,154 A | * 3/1994 | Meier et al. | 370/256 |
| 5,394,556 A | 2/1995 | Oprescu | 395/800 |
| 5,425,021 A | * 6/1995 | Derby et al. | 370/401 |

FOREIGN PATENT DOCUMENTS

| | | | |
|---|---|---|---|
| WO | 9702680 | 1/1977 | H04L/12/28 |
| WO | WO 97/0268 | * 1/1997 | |

OTHER PUBLICATIONS

Tse et al, More on the Efficiency of Interval Routing, The Computer Journal, vol. 41, No. 4, pp. 238–242, Mar. 4, 1998.*
Tan et al, Compact Routing Methods: A Survey, University of Oklahoma, pp. 1–15, 1995.*
Bakker et al. (Linear Interval Routing, http://citeceer.nj.nec.com/bakker91linear.html, pp. 1–17, 1991).*
*Prefix routing schemes in dynamic networks* by Erwin M. Bakker et al.; 0169-7552/93/$0600®1993—Elsevier Science Publishers B.V.; pp. 403–421.

* cited by examiner

Primary Examiner—Wellington Chin
Assistant Examiner—Frank Duong
(74) Attorney, Agent, or Firm—Philip Wadsworth; Charles D. Brown; Bruce W. Greenhaus

(57) ABSTRACT

A method of designing a network results in a network with an efficient addressing scheme which allows for filters to perform a simple logical operation. The process begins by arranging a plurality of nodes connected by a plurality of bi-directional links in a tree topology. Each node is assigned a range of consecutive flow process addresses such that each packet carried in a first direction on one of the bi-directional links has an address within the range $A<X<B$ and each packet carried in a second direction on the same bi-directional link has an address within the range $\overline{A<X<B}$.

8 Claims, 4 Drawing Sheets

LOGICAL TOPOLOGY AND ADDRESS ASSIGNMENT FOR INTERCONNECTED DIGITAL NETWORKS

BACKGROUND OF THE INVENTION

I. Field of the Invention

The present invention relates to digital networks. In particular the invention relates to the interconnection of digital networks.

II. Description of the Related Art

In recent years, digital network systems have been rapidly evolving and becoming increasingly prevalent. For example, the number of digital wireless telephone systems has grown tremendously in both rural areas and large cities. In addition to the standard 900 MHz cellular telephone systems, personal communication systems which operate at 1.8 GHz are also emerging in the larger markets. Personal communication systems are scheduled for continued deployment in smaller markets.

In less developed areas, wireless local loop systems are emerging as a substitute for wireline systems. Wireless local loop systems have certain advantages over wireline systems. In order to provide wireline service, actual copper wire must be installed and connected to each building in which service is provided. The process of laying wire often entails the destruction of existing roads or the installation of a great number of telephone poles. Such installation procedures are invasive to the existing infrastructure, time consuming and expensive. In contrast, in a wireless local loop system, service can be provided to a wide area with the installation of a single base station.

Wireless private branch exchange (PBX) systems are also becoming more prevalent. A wireless PBX system can provide coverage to a related group of users. For example, wireless PBX systems are used in large office buildings. A wireless PBX user may travel throughout the coverage area (i.e., the office building) with his telephone set. The users of a wireless PBX system may contact each other by dialing an extension rather than a full public branch exchange number.

In addition to the increased prevalence of cellular systems, new uses for cellular systems have also developed. For example, data services are commonly provided over existing cellular systems. Data services include data transfer between computers, wireless meter reading, paging services and mobile news service.

Each of the cellular systems discussed above has the characteristic that it is comprised of a plurality of spaced apart base stations. In the most general embodiment, base stations are physically located in the center of a corresponding coverage area. The coverage areas abut one another to form a large, contiguous service area. The base station may use one of a variety of existing or later developed communication techniques to communicate with remote units located within its coverage area. For example, the base station may communicate with the remote units using frequency modulation (FM), time division multiple access (TDMA), a combination of TDMA and frequency hopping (such as GSM) or code division multiple access (CDMA). The use of CDMA provides many advantages to the system such as un-interrupted handoff between base stations, immunity to fading and very high system capacity. Therefore, the following information is disclosed with reference to a CDMA system. However, the generic principles described herein are directly applicable to non-CDMA systems and also non-cellular systems in which digital networks are interconnected.

FIG. 1 shows a block diagram of a typical CDMA Cellular Land Network (CCLN). FIG. 1 shows seven base stations 10A–10G. Each one of the base stations 10A–10G defines a corresponding hexagonal coverage area 12A–12G in which it provides service. Although only seven base stations are shown in FIG. 1, in reality most CCLNs comprise a much greater number of base stations.

Assume a remote unit initiates a communication link with a land line telephone from within the coverage area 12F. The remote unit sends an access message to the base station 10F. The base station 10F transfers the message to a base station controller (BSC) 26. The BSC 26 verifies the authenticity of the remote unit, initiates the billing process and allocates resources within the base station 10F and other portions of the system to be used during the call. This process requires the transfer of more than thirty (30) messages throughout the system. An understanding of the precise nature of these transactions is not fundamental to the present invention.

Instead, of greater importance to us is that, even before a communications link is established between the remote unit and the public switch telephone network, a great number of messages must be transferred between remotely located digital equipment units.

The transfer of messages is facilitated by the use of a CDMA interconnect subsystem (CIS) 20. The CIS 20 is comprised of one or more distribution/consolidation (DISCO) units such as a DISCO 22 shown in FIG. 1. The DISCO 22 is a router, which receives input from a plurality of input ports, consolidates the inputs onto an internal bus. A series of output ports are connected to the internal bus. Each output port has an associated address range. Each message on the internal bus is distributed to the output port which has an address range which includes the address of the message.

Returning to the example above, when the remote unit sends an access message to the base station 10F, the base station 10F creates a message (which may comprise a series of message packets) having an address indicating a control unit within the BSC 26. The base station lo places the message on a corresponding wireline link 14F. The wireline link 14F conveys the message to an input port on the DISCO 22. Within the DISCO 22, a comparison of the address of the message is made with the address ranges of the output port of the DISCO 22. The message has an address within the address filter range associated with a link 28 and, thus, the DISCO 22 routes the message to the BSC 26.

When the BSC 26 allocates resources to be used during the communication with the remote unit, it must designate a cellular modem. The selector bank subsystem (SBS) 30 is comprised of a bank of cellular modems 32A–32X. The BSC 26 sends a message through the DISCO 22 to alert the cellular modem 32A of the connection. The BSC 26 also sends a message to the base station 10F giving the address of the cellular modem 32A.

During the connection, for each frame received from the remote unit over the wireless link, the base station 10F sends a packet of data through the DISCO 22 to the cellular modem 32A. Also, during the connection, the cellular modem 32A sends frames of data intended for the remote unit through the DISCO 22 to the base station 10F.

In this example, let us assume that the remote unit is a cellular portable telephone. The remote unit may change location during the course of the connection. A typical CDMA system employs soft handoff which allows uninterrupted connection during the handoff process from one base station to another. For example, if the remote unit moves from the coverage area 12F to the coverage area 12E, it establishes a connection with the base station 10E before the connection with the base station 10F is released. When the remote unit is simultaneously communicating with the base station 12E and the base station 12F, it is said to be in soft handoff. During soft handoff, the frames emanating from the remote unit are received by both the base station 10E and the base station 10F and forwarded to the DISCO 22 via the link 14E and the link 14F respectfully. The DISCO 22 routes both packet streams to the cellular modem 32A which creates one stream of data to pass to a switch 40.

A CCLN such as the one shown in FIG. 1 has a rather large but limited capacity. The capacity is limited by a number of practical considerations. For example, the capacity is limited by the number of input ports and output ports which can be supported by a single CIS. The capacity is also limited by the maximum geographic distance over which the links 14A–14G operate. Therefore, a large city is typically comprised of more than one CCLN.

Therefore, as a remote unit moves about in a metropolitan area, it may move from the coverage area of one CCLN into the coverage area of a second CCLN. When a communication connection is transferred from a base station associated with a first CCLN to a base station associated with a second CCLN, a number of control messages as well as a number of remote unit data messages must be transferred between the two CCLN systems. Therefore, in order to support a transfer of communication between base stations which are not a part of the same CCLN, a means to effect communication between the CCLNs is necessary.

The CCLNs are connected by the connection of a DISCO in one system with a DISCO of another system. FIG. 1 shows such a connection from the DISCO 22 to/from a DISCO associated with another CCLN. A large address filter 24 passes only those messages having an address corresponding to another CCLN.

FIG. 2 shows a prior art connection configuration with five (5) CCLNs: CCLNA, CCLNB, CCLNC, CCLND, and CCLNE. Note that the number of addresses associated with each CCLN is quite large as each element within each CCLN must have a distinct address. In FIG. 2, each CCLN is directly attached to each other CCLN. Therefore, each of the 5 CCLNs has four address filters. Each of the address filters passes only those packets which are within the range of the corresponding connected CCLN. The problem with the design shown in FIG. 2 is that it impractically increases the size and complexity of the DISCO especially as the number of CCLNs is increased from 5 to a much larger number. Also as the number of address filters increases, the complexity and expense of the interconnection system greatly increases.

FIG. 3 shows another prior art arrangement of five (5) CCLNs. In FIG. 3, each CCLN has only two address filters. In FIG. 3, if CCLNA has a frame for either CCLNB or CCLNC it passes the frame to the CCLNB. The CCLNB transfers frames intended for CCLNA or CCLNE to CCLNA. The problem with the arrangement shown in FIG. 3 is that as the number of CCLNs increases, the delay associated with transferring information around the loop increases. Also, as the number of CCLNs increases, the amount of CCLN processing resources expended to pass through data reaches impractical limits. Another large disadvantage is that the loop configuration is not robust in the presence of failures. If one of the filters fails, a frame of data may begin an endless journey around the loop. In this case, system resources are unnecessarily consumed. If a great number of frames are making an endless journey around the loop, the entire system may become overloaded and fail.

In general, in any system which comprises loops, any single packet of data may traverse two different paths on its journey to the destination node. Obviously any packet which traverses the network over two paths unnecessarily consumes system resources.

In both FIGS. 1 and 2, the address filters play a significant role in determining the complexity and the efficiency of the system. In prior art base stations, the address filters may comprise large look-up tables. As each packet enters the filter, the filter compares the address in the address header to entries in the table. If a match is found, the filter passes the packet through the filter. Such a filter requires a large amount of memory and circuitry. Operation of such a system requires a significant amount of processing time for each packet. Therefore, in a large system with many addresses, the filtering process consumes large amounts of the system resources and can add significant delay to the journey of a packet.

Thus, it will be appreciated that there is a need in the industry for a means and method of interconnecting nodes on a large digital system which overcomes the complexities and shortcomings of the prior art. The present invention provides a simple and efficient means and method for interconnecting such devices.

SUMMARY OF THE INVENTION

When a large digital network is interconnected with a multiplicity of other large digital networks, an efficient logical topology and a corresponding address assignment must be determined. According to the invention, a network is determined which has a tree topology in which the addresses associated with each branch of the tree are a contiguous set of numbers or the converse of a contiguous set. Each branch of the system uses only one simple logical address filter to determine packets which pass through the filter. The invention provides means of determining an address assignment for a general network given a number of design parameters.

The invention offers several advantages over prior art systems. One of the advantages is that each node on the tree has a path to each other node. Therefore, no portion of the network is disconnected with any other portion. Another advantage is that the topology eliminates the need to broadcast packets. When a node broadcasts a packet, the packet is transmitted from the transmitting node to every other node in the system. Broadcasting consumes a substantial amount of network resources.

Avoiding the use of broadcast signals greatly increases the efficiency of the present design.

Yet another advantage is that the topology of the invention does not comprise loops. If the system comprises loops, any single packet of data may traverse two different paths on its journey to the destination node. In this case, system resources are unnecessarily consumed.

Also, in the invention, all addresses that may pass into or out of a port on a node have contiguous addresses or are the logical converse of a contiguous set of addresses. The advantage of contiguous addresses is that a single, simple logical address filter can be used at each port. The concept of contiguous addresses and the advantages gained by their use shall be more clear when taken in conjunction with the discussion below.

The invention is a novel and improved logical topology and corresponding address assignment system for interconnecting large digital networks and a means for determining such an assignment. According to the invention, addresses are assigned to a set of nodes in a tree topology such that a single filter using a single simple logical operation connects each branch of the tree.

According to the invention, a system is designed which has a tree topology in which the addresses associated with each branch of the tree are a contiguous set or the converse of a contiguous set of numbers. Each branch of the system uses only one address filter to determine packets which pass through the filter. The address filter is a simple logical function which can be implemented with a small amount of circuitry.

According to the invention, the nodes are arranged in a tree topology in which each node is connected to each other node by a single path. Next, an ordered list of the nodes is generated. In order to generate the list, one node is designated a root node and is recorded on the list. The flow now enters any node connected to the root node which does not yet have an entry on the list. The second node is recorded. The flow continues to enter subsequent unrecorded nodes while sequentially recording each node on the list. When the flow arrives at a node to which no unrecorded node is connected, the flow retreats one node closer to the root node without recording an entry on the list. If unrecorded nodes are connected to the node, the flow continues as above. If each of the connected nodes has a corresponding entry on the list, the flow retreats again. Flow continues in this manner until all the nodes of the system have been recorded. Once recorded, each node is assigned a number of sequential address blocks according the list.

BRIEF DESCRIPTION OF THE DRAWINGS

The novel features of the present invention maybe better understood from the accompanying description when taken in conjunction with the accompanying drawings in which like characters refer to like parts and in which.

DETAILED DESCRIPTION OF THE PREFERRED EMBODIMENTS

Figure 1:
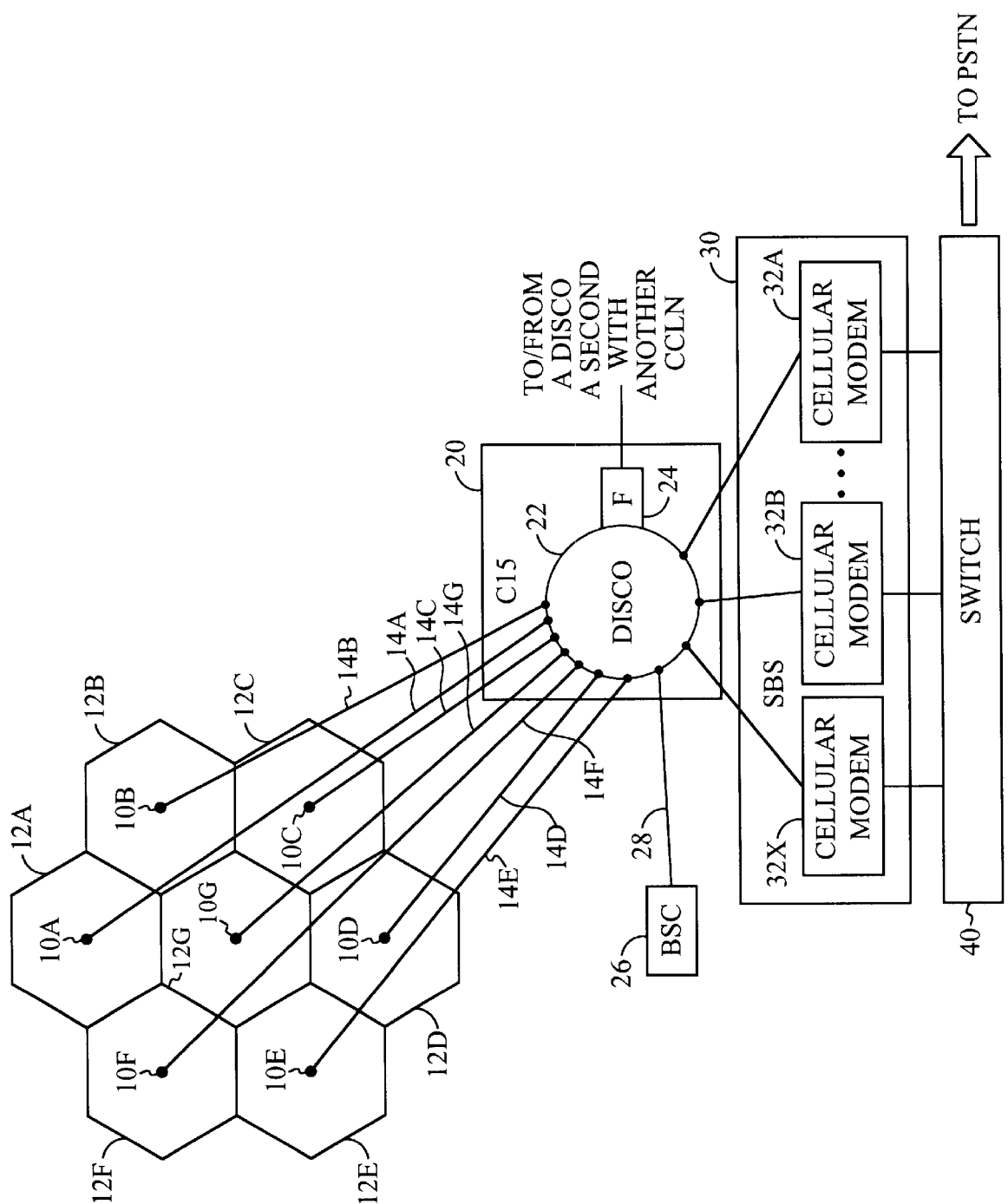
FIG. 1 is a block diagram of a CDMA Cellular Land Network.
Figure 2:
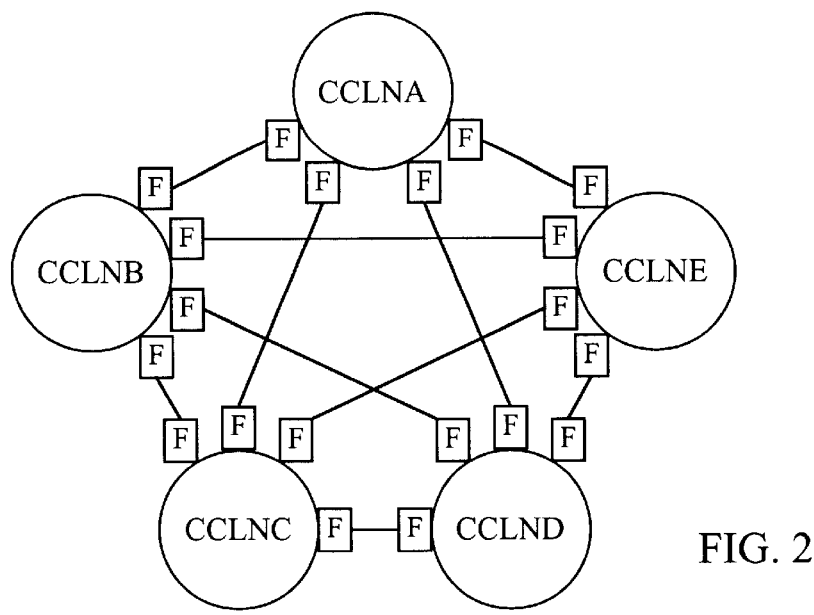
FIG. 2 is a block diagram showing a prior art configuration for interconnection of five (5) CCLNs.
Figure 3:
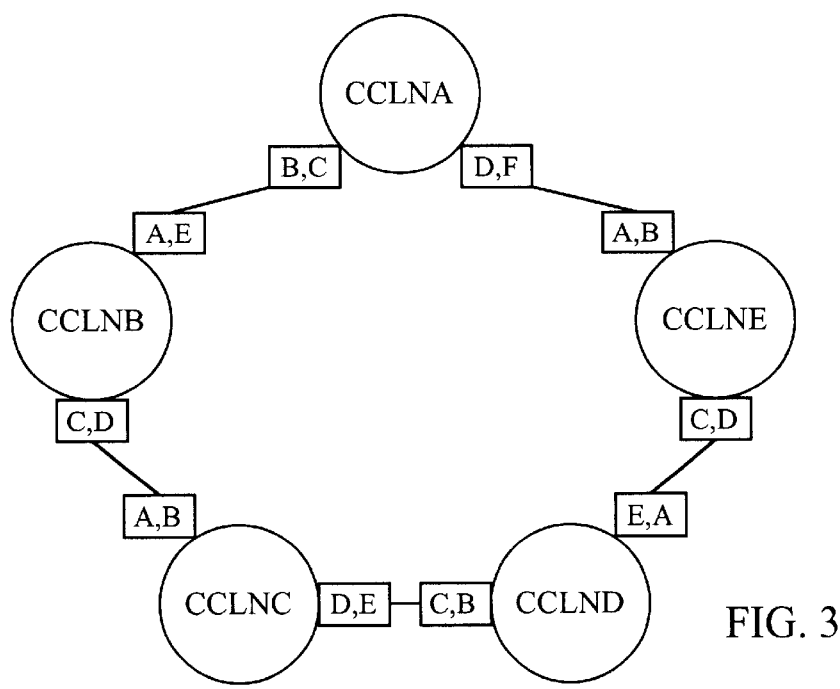
FIG. 3 is a block diagram showing another prior art configuration for interconnection of five (5) CCLNs.
Figure 4:
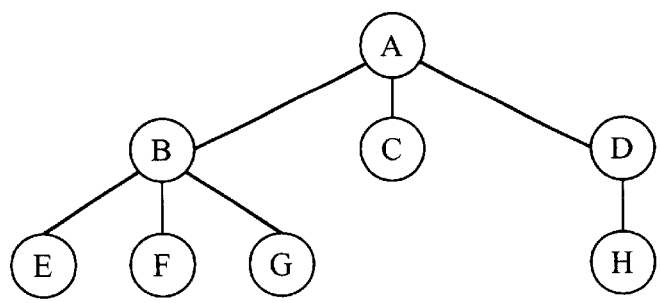
FIG. 4 is a block diagram showing a tree topology.

In FIG. 4, the eight nodes have been arranged in a tree topology. A tree topology is one in which no node is connected to any other node by more than one path. The topology is arbitrary in that it is not necessary to limit the number of nodes which are connected to any other node. The tree shown in FIG. 4 may have been selected for a variety of reasons. The topology may have been chosen using any one of a few well-known algorithms such as a minimum-spanning tree algorithm. In this case, we shall assume that the node B is co-located with the nodes E, F and G which are all located some great distance from the node A. (If it is practical to establish only one link from the node A to the set of nodes B, E, F, and G, the topology of FIG. 4 is a logical topology.)

Each packet of data packet transferred between two nodes contains an address header which is many binary digits in length. According to the invention, each node is assigned a block of addresses. Address blocks are a set of addresses having sequential address values. Each node may have a different requirement as to the number of addresses that it requires. Typically, addresses are divided into sets having a basic address block size and each node is assigned an integer multiple of the basic address block size. For convenience, the basic address block size is typically chosen such that it maybe expressed in terms of $2^n$. In this way, the address filter may examine only a subset of the total number of bits in the address header in order to determine whether to pass the packet.

For example, in a small system, a basic address block size of 1024 addresses may be assigned. Each node in the system may have a different address requirement. For explanatory purposes, assume that the nodes Shown in FIG. 4 have the following address requirements:

| | |
|---|---|
| Node A | 5 address blocks; |
| Node B | 1 address block; |
| Node C | 2 address blocks; |
| Node D | 2 address blocks; |
| Node E | 2 address blocks; |
| Node F | 3 address blocks; |
| Node G | 1 address block; and |
| Node H | 2 address blocks. |

Figure 5:
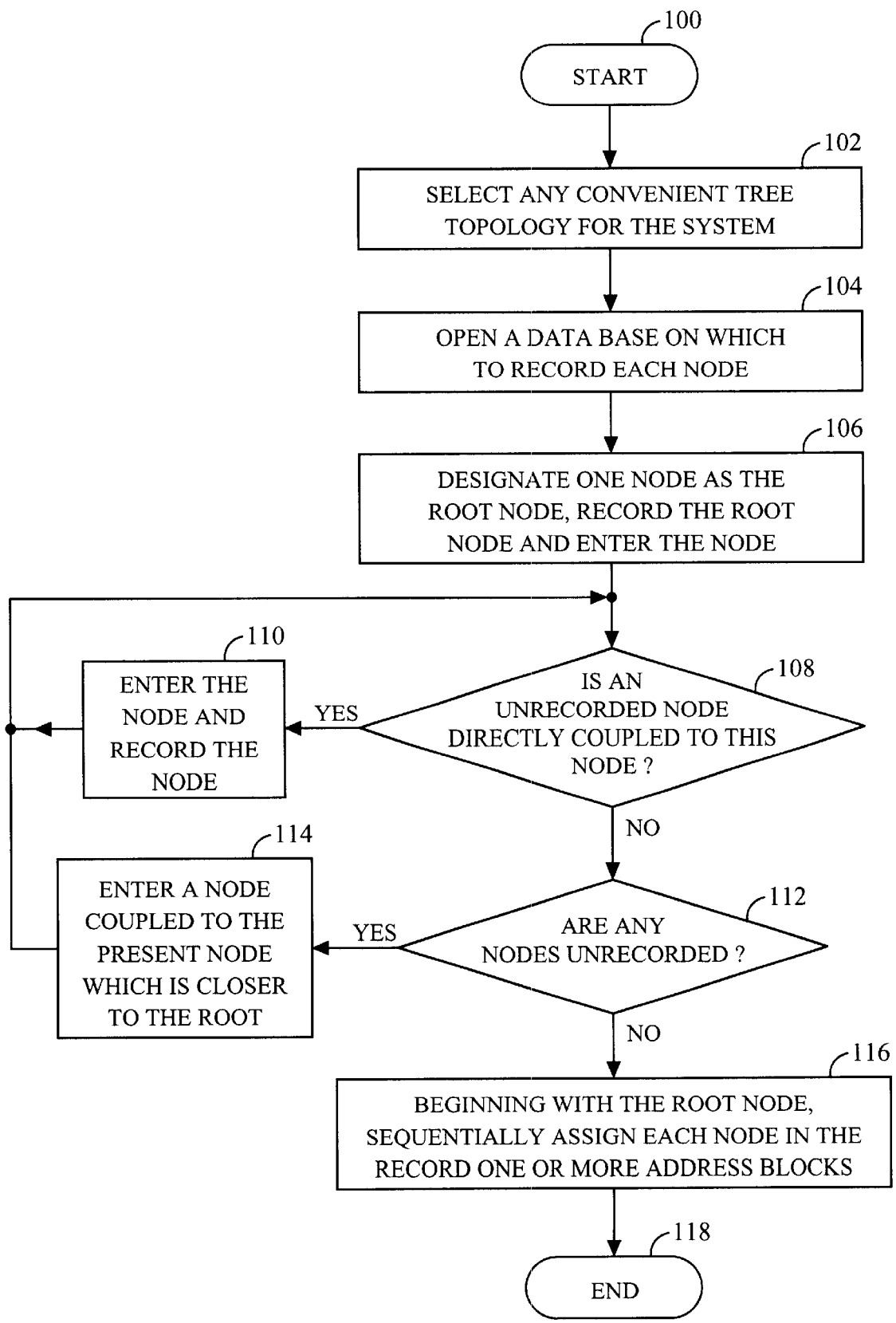
FIG. 5 is a flow chart showing the process of assigning addresses.

The method of creating an efficient addressing scheme and tree topology is detailed in the flow chart shown in FIG. 5. The method may be carried out by a variety of means well known in the art. For example, a simple software program may be designed which runs on a standard microprocessor. The method may be integrated with a more complex system for designing a new network system. The process shown in FIG. 5 is most easily described with reference to an example. Assume that we are designing a network with eight nodes shown in FIG. 4.

Process flow begins with start block 100 of FIG. 5. In block 102, the nodes are arranged in any convenient tree topology. For this example, we shall assume that the nodes have been arranged as shown in FIG. 4. After selection of any convenient tree topology, the flow continues to block 104. In block 104, a data base is opened on which to store the results of further processing. In block 106, one node is designated as the root node. In FIG. 4, we shall designate the node A as the root node. Any node can be chosen as the root node. Therefore, according to block 106, the root node is recorded on the data base such that the data base contains the following entry. A. Also in block 106, we "enter" the root node to begin the journey through the network to establish the data base.

Block 108 asks whether any unrecorded node is directly coupled to this node. In this case, all three nodes connected to the node A are unrecorded so the answer is "yes" and the flow continues in block 110. In block 110, the flow enters the unrecorded node and an entry is recorded in the data base. In this case, assume that we enter the node B. After execution of block 110, the data base contains the following entries: AB. Flow continues back to block 108.

Again, block 108 asks whether any unrecorded node is directly coupled to this node. In this case, three nodes connected to the node B are unrecorded and only one node is recorded so the answer is "yes" and the flow continues in block 110. In block 110, the flow enters the unrecorded node and an entry is recorded in the data base. In this case, assume that we enter the node E. After the second execution of block 110, the data base contains the following entries: ABE. Flow continues back to block 108.

Again, block 108 asks whether any unrecorded node is directly coupled to this node. In this case, the only node connected to the node E is the node B and it has already been recorded. Therefore, the answer is "no" and the flow continues in block 112. Block 112 asks whether any nodes are unrecorded. In this case, the nodes C, D, F, G and H are unrecorded, therefore, the answer is "yes". Flow continues to block 114. Block 114 requires the process to enter a node coupled to the present node which is closer to the root node than the present node. Note that no entry is made on the data base. In this case, the process enters the node B again. Flow continues back to block 108.

Flow continues according to the process until the data base contains the following entries: ABEFGCDH. At this point, there are no more unrecorded nodes and the flow continues into block 116. In block 116, each block is sequentially assigned one or more address blocks according to the corresponding requirements. The results are shown below.

|        | Address blocks | Addresses     |
|--------|----------------|---------------|
| Node A | 1, 2, 3, 4, 5  | 0–5119        |
| Node B | 6              | 5120–6143     |
| Node E | 7, 8           | 6144–8191     |
| Node F | 9, 10          | 8192–10,239   |
| Node G | 11, 12         | 10,240–12,287 |
| Node C | 13, 14, 15     | 12,288–15,359 |
| Node D | 16             | 15,360–16,384 |
| Node H | 17, 18         | 16,384–18,431 |

The results are illustrated by reference to FIG. 6 which contains the results of the above process. The notation used on FIG. 6 refers to address blocks rather than actual addresses for ease of illustration and comment. A translation from address block to corresponding addresses is made directly by reference to the above chart.

Figure 6:
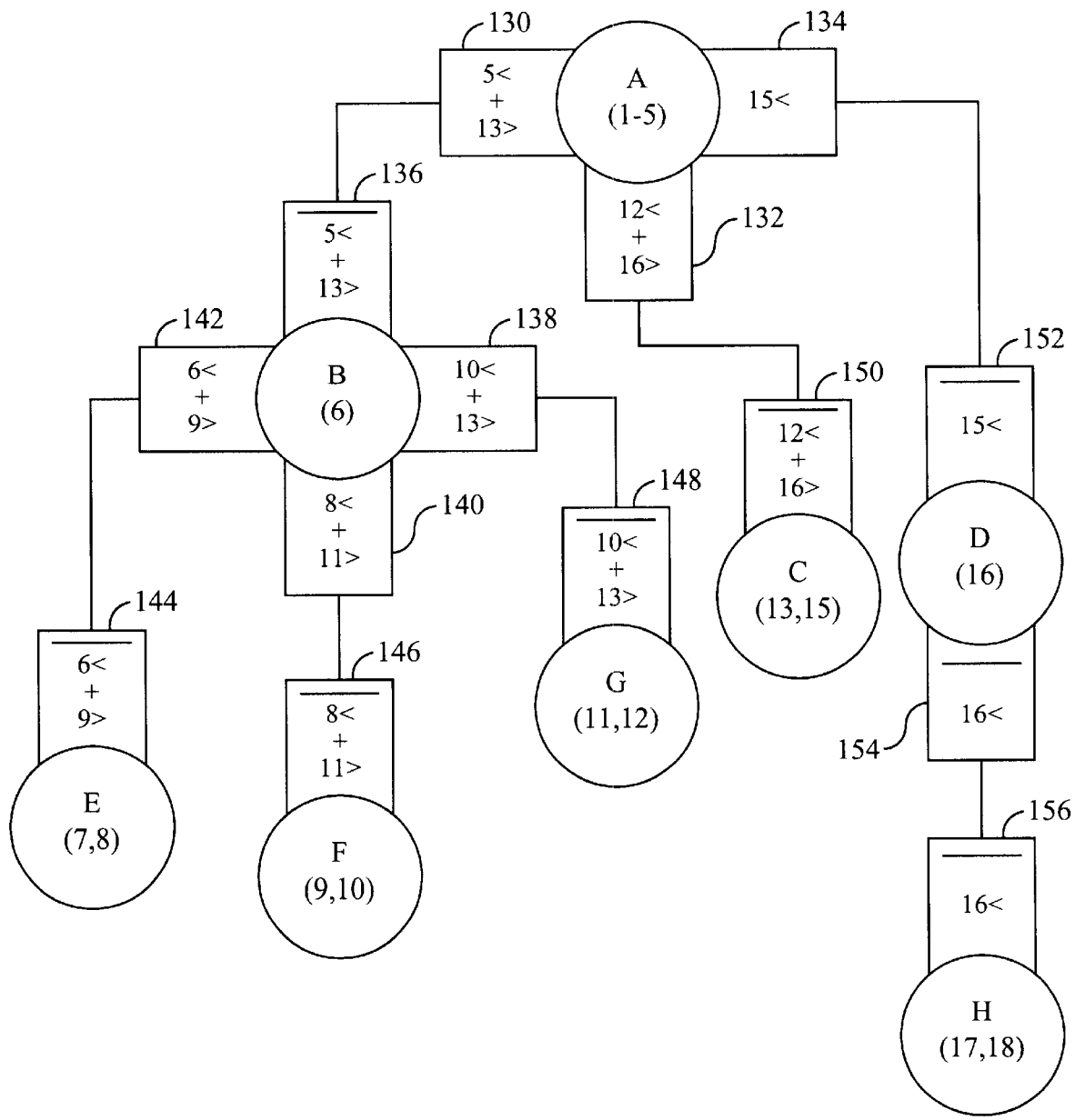
FIG. 6 is a block diagram showing the tree topology of FIG. 4 with addresses assigned according to the present invention.

In FIG. 6, the node A has three address filters 130, 132 and 134 which provide the simple logical functions which are used to direct packets throughout the system. The address filter 130 passes packets which have an address greater than 5 and less than 13. The address filter 132 passes packets which have and address greater than 12 and less than 16. The address filter 134 passes packets which have an address greater than 15.

The node B has four address filters 136, 138, 140 and 142. The address filter 136 passes all those address which are not greater than 5 and less than 13. Note that the address filter 136 performs the converse logical function as the address filter 130. Each of these operations is a very simple logical function. Thus, instead of a look-up table, the address filter is a simple logical operation which results in a true or false determination. If the determination is true, the filter passes the packet. If the determination is false, the filter does not pass the packet. The above-described address filters as well as the remaining address filter values are given in the following chart where X is the packet address.

| Node | Address Filter Designation | Logical Operation |
|------|----------------------------|-------------------|
| A    | 130                        | 5 < X < 13        |
|      | 132                        | 12 < X < 16       |
|      | 134                        | 15 < X            |
| B    | 136                        | 5 ≮ X ≮ 13        |
|      | 138                        | 10 < X < 13       |
|      | 140                        | 8 < X < 11        |
|      | 142                        | 6 < X < 9         |
| C    | 150                        | 12 < X < 16       |
| D    | 152                        | 15 < X            |
|      | 154                        | 16 < X            |
| E    | 144                        | 6 < X < 9         |
| F    | 146                        | 8 < X < 11        |
| G    | 148                        | 10 < X < 13       |
| H    | 156                        | 16 < X            | where A≮X≮B denotes the logical converse of A<X<B and A is the lower bound address and B is the upper bound address as shown above.

Thus it can be readily seen from the above chart that the address filters may be implemented using a single, simple logical operation because of the contiguous and ordered configuration. Thus, no address table is needed and the filter process is quickly and efficiently performed.

The process shown in FIG. 5 is exemplary and modifications can be made to the process while still yielding a logical topology and address assignment according to the invention. For example, each node through which the flow progresses can be recorded on the data base whether or not the node has been previously recorded. The subsequent entries of a common node are either erased or ignored when the address assignments are made.

Also note that the results obtained by the exemplary use of the process of FIG. 5 as shown in FIG. 6 is only one of many assignments that conform with the invention. Throughout the assignment process, arbitrary decisions are made. For example, a node is arbitrarily chosen as a root node. As the process progress, arbitrary choices are made as to the next unrecorded node to be added to the record. Each permutation of the process of FIG. 5 produces a configuration within the ambit of the invention.

The previous description on the preferred embodiments are provided to enable any person skilled in the art to make or use the invention. Various modifications to these embodiments will be readily apparent to those skilled in the art, and the generic principles defined wherein may be applied to another embodiments without the use of inventive faculty. Thus, the invention is not intended to be limited to the embodiment herein, but is to be accorded the widest scope consistent with the principles as novel features disclosed herein.

We claimed:

1. A network of nodes comprising:
   a root node;
   a second node directly coupled to the root node, the second node having an address;
   a plurality of nodes directly coupled to the second node, each of the plurality of nodes having an address; and
   an address filter coupled to the root node, the address filter being associated with at least one filter range and allowing transmission of a data packet from the root node to the second node only if the data packet is addressed to a node having an address that lies within one of the filter ranges, each filter range being defined by a high range limit and a low range limit, the only restriction on the values of the high and low range limits being that the high range limit is not lower than the low range limit.

2. The network of claim 1 further comprising a second address filter coupled to the second node, the address filter being associated with at least one filter range and allowing transmission of a data packet from the second node to the root node only if the data packet is not addressed to a node having an address that lies within one of the filter ranges.

3. The network of claim 1 wherein each node of said plurality of nodes is assigned an address block comprised of a set of consecutive address values of an arbitrary size.

4. The network of claim 1 wherein said root node, said second node and each node of said plurality of nodes is comprised of a distribution/consolidation unit.

5. The network of claim 1 wherein said root node, said second node and each of said plurality of nodes comprise a cellular land network.

6. The network of claim 5 wherein said data packet comprises a frame of voice data.

7. A network arranged in a tree configuration comprising:

a first node associated with a first block of address values;

a first address filter for coupling a data packet from the first node to a first set of nodes when an address of the data packet is within a contiguous range of addresses defined by a first high range limit and a first low range limit, the first set of nodes comprising at least one node and only a first one of the first set of nodes is directly coupled to the first node through the first address filter and the first address filter couples the data packet to the first set of nodes if the address of the data packet is not greater than a high range limit and is not lower than a low range limit; and a second address filter for coupling packets from the first node to a second set of nodes when an address of the data packet is within a contiguous range of addresses defined by a second high range limit and a second low range limit, the second set of nodes comprising at least one node, only a first one of the second set of nodes being directly coupled to the first node through the second address filter, the second address filter coupling the data packet to the second set of nodes.

8. The network of claim 7 wherein said first set of nodes is an asymmetrical tree network.

* * * * *